United States Patent
Poggio

(10) Patent No.: US 12,415,232 B2
(45) Date of Patent: Sep. 16, 2025

(54) METHOD TO EXECUTE A WELD OF AN ELECTRODE OF A CELL WHICH IS PART OF A BATTERY

(71) Applicant: FERRARI S.p.A., Modena (IT)

(72) Inventor: Luca Poggio, Modena (IT)

(73) Assignee: FERRARI S.P.A., Modena (IT)

( * ) Notice: Subject to any disclaimer, the term of this patent is extended or adjusted under 35 U.S.C. 154(b) by 1002 days.

(21) Appl. No.: 17/505,787

(22) Filed: Oct. 20, 2021

(65) Prior Publication Data

US 2022/0126400 A1 Apr. 28, 2022

(30) Foreign Application Priority Data

Oct. 22, 2020 (IT) .................. 102020000024940

(51) Int. Cl.
  *B01F 35/42* (2022.01)
  *A23L 2/54* (2006.01)
  *B01F 23/236* (2022.01)
  *B01F 23/2361* (2022.01)
  *B01F 33/501* (2022.01)
  *B23K 26/22* (2006.01)
  (Continued)

(52) U.S. Cl.
  CPC ........... *B23K 26/22* (2013.01); *H01M 50/516* (2021.01); *H01M 50/536* (2021.01)

(58) Field of Classification Search
  CPC .............. H01M 50/536; H01M 50/516; B23K 26/034; B23K 26/22; B23K 26/244; B23K 31/125; B23K 20/10; B23K 2101/36; Y02E 60/10
  USPC ................................... 219/121.64
  See application file for complete search history.

(56) References Cited

U.S. PATENT DOCUMENTS

2010/0314362 A1* 12/2010 Albrecht ............... B23K 37/00
  219/121.63
2011/0108181 A1* 5/2011 Cai ......................... B29C 65/08
  228/104

(Continued)

FOREIGN PATENT DOCUMENTS

DE 102011078276 B3 12/2012
DE 102016204577 A1 9/2017
KR 20200107280 A 9/2020

OTHER PUBLICATIONS

Search Report for IT Application No. 2020000024940, completed Jul. 13, 2021, 9 pages.

(Continued)

*Primary Examiner* — Eric S Stapleton
(74) *Attorney, Agent, or Firm* — CANTOR COLBURN LLP

(57) ABSTRACT

A method to execute a weld of an electrode of a cell which is part of a battery and having the steps of: causing the electrode to come into contact with another element to which the electrode must be welded; locally heating the electrode and the other element so as to locally cause a melting of the metal making up the electrode and of the metal making up the other element in order to generate a weld pool; waiting for the weld pool to cool down, thus giving stability to the weld; capturing, by means of a video camera, a series of digital images of the weld pool during the heating; analysing the digital images in order to determine a value of at least one parameter of the welding process; and changing the execution of the melting process based on the value of the parameter.

16 Claims, 4 Drawing Sheets

(51) Int. Cl.
*H01M 50/516* (2021.01)
*H01M 50/536* (2021.01)

(56) References Cited

U.S. PATENT DOCUMENTS

| | | | | |
|---|---|---|---|---|
| 2013/0309000 | A1* | 11/2013 | Lin | B23K 26/0652 |
| | | | | 219/121.64 |
| 2014/0131333 | A1* | 5/2014 | Zhang | B23K 9/0956 |
| | | | | 219/130.21 |
| 2014/0175071 | A1* | 6/2014 | Pfitzner | B23K 26/32 |
| | | | | 348/90 |
| 2016/0267806 | A1* | 9/2016 | Hsu | B23K 9/0956 |
| 2017/0341144 | A1* | 11/2017 | Pelaprat | B23K 26/0876 |
| 2018/0250744 | A1* | 9/2018 | Symeonidis | B22F 10/366 |
| 2018/0250745 | A1* | 9/2018 | Spink | B22F 10/366 |
| 2018/0250746 | A1* | 9/2018 | Symeonidis | B23K 26/703 |
| 2018/0250771 | A1* | 9/2018 | Brown | B33Y 40/00 |
| 2018/0250772 | A1* | 9/2018 | Symeonidis | B23K 26/0006 |
| 2018/0250773 | A1* | 9/2018 | Symeonidis | B23K 26/34 |
| 2018/0250774 | A1* | 9/2018 | Symeonidis | B23K 26/1224 |
| 2018/0250775 | A1* | 9/2018 | Spink | B23K 26/10 |
| 2019/0022793 | A1* | 1/2019 | Haug | B23K 31/125 |
| 2020/0230732 | A1* | 7/2020 | Albrecht | B23K 9/0282 |

OTHER PUBLICATIONS

Extended European Search Report for Application No. 21204191.7 mailed Mar. 1, 2022.

* cited by examiner

METHOD TO EXECUTE A WELD OF AN ELECTRODE OF A CELL WHICH IS PART OF A BATTERY

CROSS-REFERENCE TO RELATED APPLICATIONS

This patent application claims priority from Italian patent application no. 102020000024940 filed on Oct. 22, 2020, the entire disclosure of which is incorporated herein by reference.

TECHNICAL FIELD

The present invention relates to a method to execute a weld of an electrode of a cell which is part of a battery.

PRIOR ART

Currently, batteries made up of a large number of parallelepiped-shaped pouch cells, each of which has two electrodes (anode and cathode), are very much widespread in the automotive field; in particular, several groups are formed, each having a plurality of cells connected to one another in series while the various groups can be connected to one another in series or parallel.

The connections of the electrodes of the cells (both with other electrodes and with connecting bars) are normally carried out by means of a welding process that can use the laser welding technology or the ultrasonic welding technology. It is very important that the welding of the electrodes of the cells ensures both a good electrical connection (i.e. an electrical connection with low electrical resistance) so as to prevent excessive power losses due to the Joule effect, and a high mechanical resistance so as to prevent the weld from being broken due to the stresses to which a car battery is subjected during its life (in fact when an impact or a vibration is applied to the battery causing the relative movement of the cells of the battery, the stress can be focused on the welds of the electrodes).

Patent application US2011108181A1 describes a method for the monitoring and the control in real-time of the quality of a vibration welding.

Patent application KR20200107280A describes a method for optimizing the ultrasonic welding of the electrodes of a cell of a battery.

Patent application US2017341144A1 describes a method for executing a laser welding of an electrode of a cell which is part of a battery.

Patent application US2019022793A1 describes a method for determining the quality of a laser welding and in particular for determining the presence of any hot cracks.

Patent application US2014175071A1 describes a method for determining defects during a laser welding.

DESCRIPTION OF THE INVENTION

The object of the present invention is to provide a method to execute a weld of an electrode of a cell which is part of a battery, which method allows obtaining welds of excellent quality (i.e. of low electrical resistance and of high mechanical resistance) and, simultaneously, is easy and cost-effective to implement.

According to the present invention, a method to execute a weld of an electrode of a cell which is part of a battery is provided, according to what is claimed in the appended claims.

The claims describe preferred embodiments of the present invention forming integral part of the present description.

BRIEF DESCRIPTION OF THE DRAWINGS

The present invention will now be described with reference to the accompanying drawings, which illustrate some non-limiting example embodiments thereof, wherein.

PREFERRED EMBODIMENTS OF THE INVENTION

Figure 1:
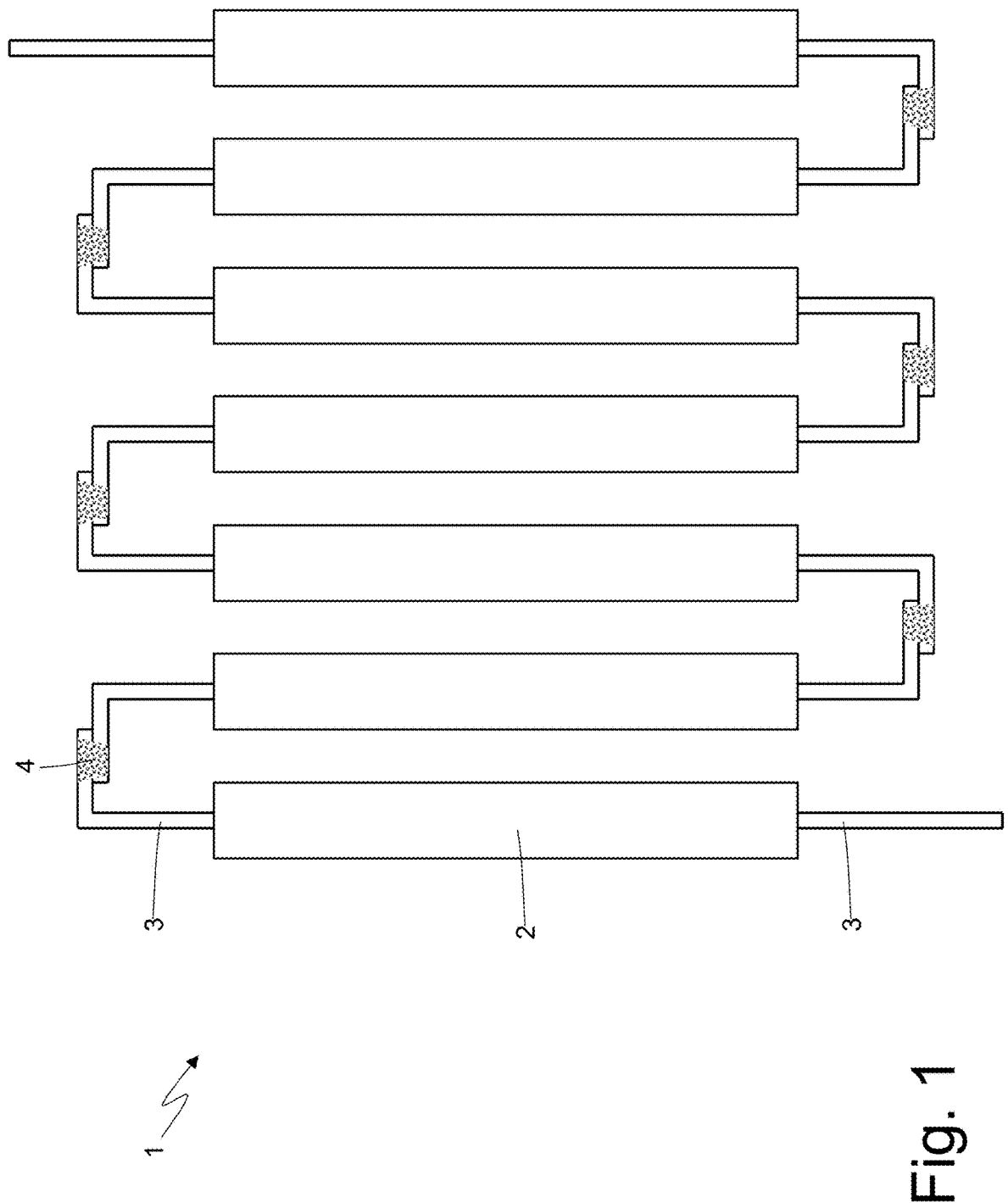
FIG. 1 is a schematic view of a battery made up of a plurality of cells side by side whose electrodes are connected together by means of welding.

In FIG. 1, reference numeral 1 indicates, as a whole, a battery for motor vehicles (i.e. for a vehicle with a partially or exclusively electric drive).

The battery 1 comprises a large number of parallelepiped-shaped pouch cells 2, each of which has two electrodes 3 (anode and cathode); in particular, several groups are formed, each having a plurality of cells 3 connected to one another in series while the various groups can be connected to one another in series or parallel.

The connections of the electrodes 3 of the cells 2 (both between the cells 2 and with connecting bars or the like) are obtained by means of corresponding welds 4 which are made by means of a welding process which can use the laser welding technology or the ultrasonic welding technology.

Figure 2:
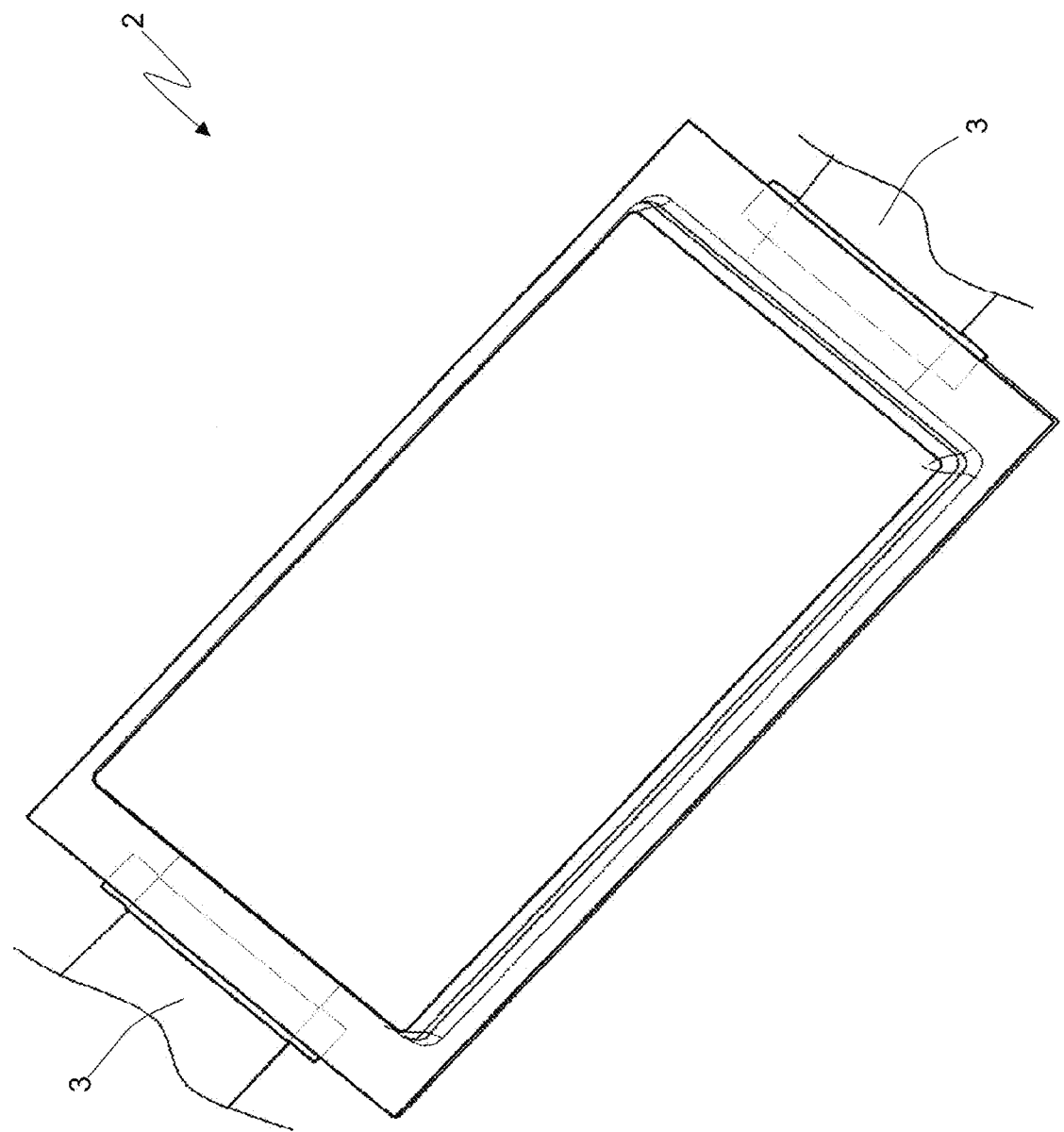
FIG. 2 is a perspective and schematic view of a single cell of the battery of FIG. 1.

As illustrated in FIG. 2, each cell is structured so that the two electrodes 3 (i.e. a cathode terminal and an anode terminal) protrude from the upper and lower ends of the cell, respectively, and are thus opposite one another.

FIG. 1 illustrates a group of cells 2 which are connected to one another in series and overlap one another; for this purpose, the electrodes 3 of two adjacent cells 2 which must be connected to one another are bent at 90° towards one another.

Figure 3:
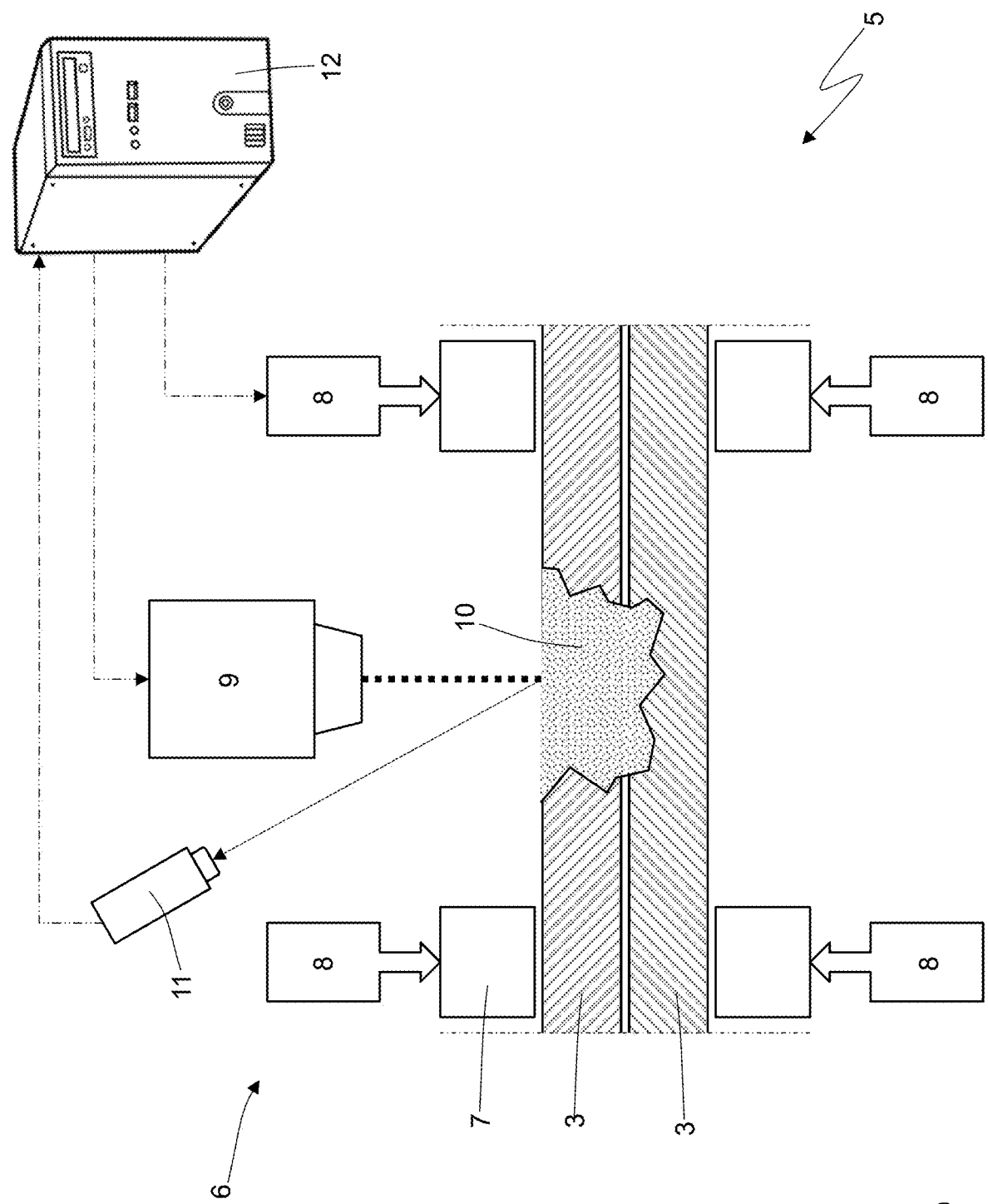
FIG. 3 is a schematic view of a welding unit which executes the weld between two electrodes of respective cells which make up the battery of FIG. 1.

FIG. 3 illustrates a welding unit 5 which executes a weld of an electrode 3 of a cell 2 with another element; in the example illustrated in FIG. 3, the other element is an electrode 3 of another cell 3, but the other element could also be a connecting bar (for example to make a parallel connection between several groups of cells 3) or another electrically conductive component of the battery 1.

The welding unit 5 comprises a joining device 6 which causes the two electrodes 3 to come into mutual contact (i.e. an electrode 3 and the other element to which the electrode 3 must be welded). In particular, the joining device 6 comprises two clamps (each consisting of a pair of jaws 7) motorised by means of respective actuators 8.

The clamps of the joining device 6 press the two electrodes 3 (i.e. an electrode 3 and the other element to which the electrode 3 must be welded) against one another with a predetermined pressure (necessary for executing the weld).

The welding unit 5 comprises an emitter device 9 which emits a laser beam which is focused on one of the two electrodes 3 (i.e. on an electrode 3 or on the other element to which the electrode 3 must be welded) and is progressively shifted so as to move along at least one heating line (which can have a linear shape or a curvilinear shape, for example circular); in particular, the laser beam emitted by the emitter device 9 can be progressively shifted so as to move along a single heating line or several heating lines parallel to one another.

The laser beam emitted by the emitter device 9 provides a concentrated source of heat and thus causes a localized heating of the electrodes 3 (i.e. of an electrode 3 or of the other element to which the electrode 3 must be welded) for locally causing a melting of the metal making up the electrodes 3 so as to generate a weld pool 10 (which is the part of metal that is in the liquid state during the welding).

Once the weld pool 10 has reached the optimal (desired) size, the emission of the laser beam is interrupted (i.e. the heating is interrupted) and the weld pool 10 is left to cool down so as to give stability to the weld (i.e. to give the weld a sufficient stability for allowing the piece to be extracted from the welding unit 5 without damaging the weld just executed).

The welding unit 5 comprises a video camera 11 which is arranged to frame the area in which the weld pool 10 is generated and is thus configured to capture a series of digital images of the weld pool 10 during the heating. Furthermore, the welding unit 5 comprises a processing device 12 which is configured to analyse the digital images so as to determine a value of at least one parameter of the welding process; furthermore, the processing device 12 is configured to change the execution of the melting process (for example the heating) based on the value of the parameter.

Preferably, the video camera 11 is a thermal imaging camera (i.e. a thermographic camera) which is sensitive to infrared radiation and, therefore, capable of obtaining thermographic digital images.

A first parameter which is determined by the processing device 12 by analysing the thermographic digital images captured by the video camera 11 is a temperature (average, minimum and/or maximum) of the weld pool 10; i.e., the first parameter is dependent on the temperature of the weld pool 10 and can be influenced by the average temperature of the weld pool 10, by the minimum temperature of the weld pool 10, and/or by the maximum temperature of the weld pool 10. If the temperature (average, minimum and/or maximum) of the weld pool 10 is below a first threshold value, the heating (i.e. the quantity of heat transmitted to the weld pool 10) is increased and if the temperature (average, minimum and/or maximum) of the weld pool 10 exceeds a second threshold value, the heating is decreased. Generally, the first threshold value is (slightly) different from the second threshold value so as to create a "hysteresis" which prevents continuous interventions on the heating power.

A second parameter which is determined by the processing device 12 by analysing the thermographic digital images captured by the video camera 11 is the size (area) of the weld pool 10. If the size (area) of the weld pool 10 is below a third threshold value, the heating (i.e. the quantity of heat transmitted to the weld pool 10) is increased and if the size of the weld pool 10 exceeds a fourth threshold value, the heating is decreased.

Generally, the third threshold value is (slightly) different from the fourth threshold value so as to create a "hysteresis" which prevents continuous interventions on the heating power.

Alternatively or additionally to the analysis of the digital images, the size (not only in terms of area, but also as overall volume) of the weld pool 10 could be determined by the processing device 12 based on a measurement of the electrical resistance between the two electrodes 3 (i.e. between an electrode 3 and the other element to which the electrode 3 must be welded): in fact, the more extended the weld pool 10 (which makes up the "connection bridge" between the two electrodes 3), the lower the electrical resistance between the two electrodes 3. In other words, the processing device 12 measures, during the execution of the weld (i.e. when the weld pool 10 has been created), the electrical resistance between the two electrodes 3 and based on the electrical resistance between the two electrodes 3 estimates the size of the weld pool 10 (additionally or alternatively to the measuring of the size of the weld pool 10 by means of the analysis of the digital images).

Preferably, the heating is changed (increased or decreased) by changing (increasing or decreasing) a speed with which the laser beam is moved along the heating line; i.e., the slower (the faster) the laser beam moves along the heating line, the greater (the lower) the heating (i.e. the amount of heat transmitted to the weld pool 10). Alternatively or additionally, the heating could be changed (increased or decreased) by changing (increasing or decreasing) an emission power of the laser beam; i.e., the greater (the lower) the emission power of the laser beam, the greater (the lower) the heating (i.e. the quantity of heat transmitted to the weld pool 10).

According to a possible embodiment, if the size of the weld pool 10 is below the third threshold value, a width is increased (additionally or alternatively to the increase of the heating) of a focusing point of the laser beam (i.e. the focusing point of the laser beam is enlarged) and if the size of the weld pool 10 exceeds the fourth threshold value, the width is decreased (additionally or alternatively to the decrease of the heating) of the focusing point of the laser beam (i.e. the focusing point of the laser beam is narrowed).

A third parameter which is determined by the processing device 12 by analysing the thermographic digital images captured by the video camera 11 is the (possible) presence of areas of the weld pool 10 without melted metal (i.e. the presence of "holes" in the weld pool 10). In case of presence of areas of the weld pool 10 without melted metal (i.e. in case of "holes" in the weld pool 10), the processing device 12 acts upon the joining device 6 so as to increase the pressure with which the two electrodes 3 (i.e. an electrode 3 and the other element to which the electrode 3 must be welded) are pressed against one another.

Figure 4:
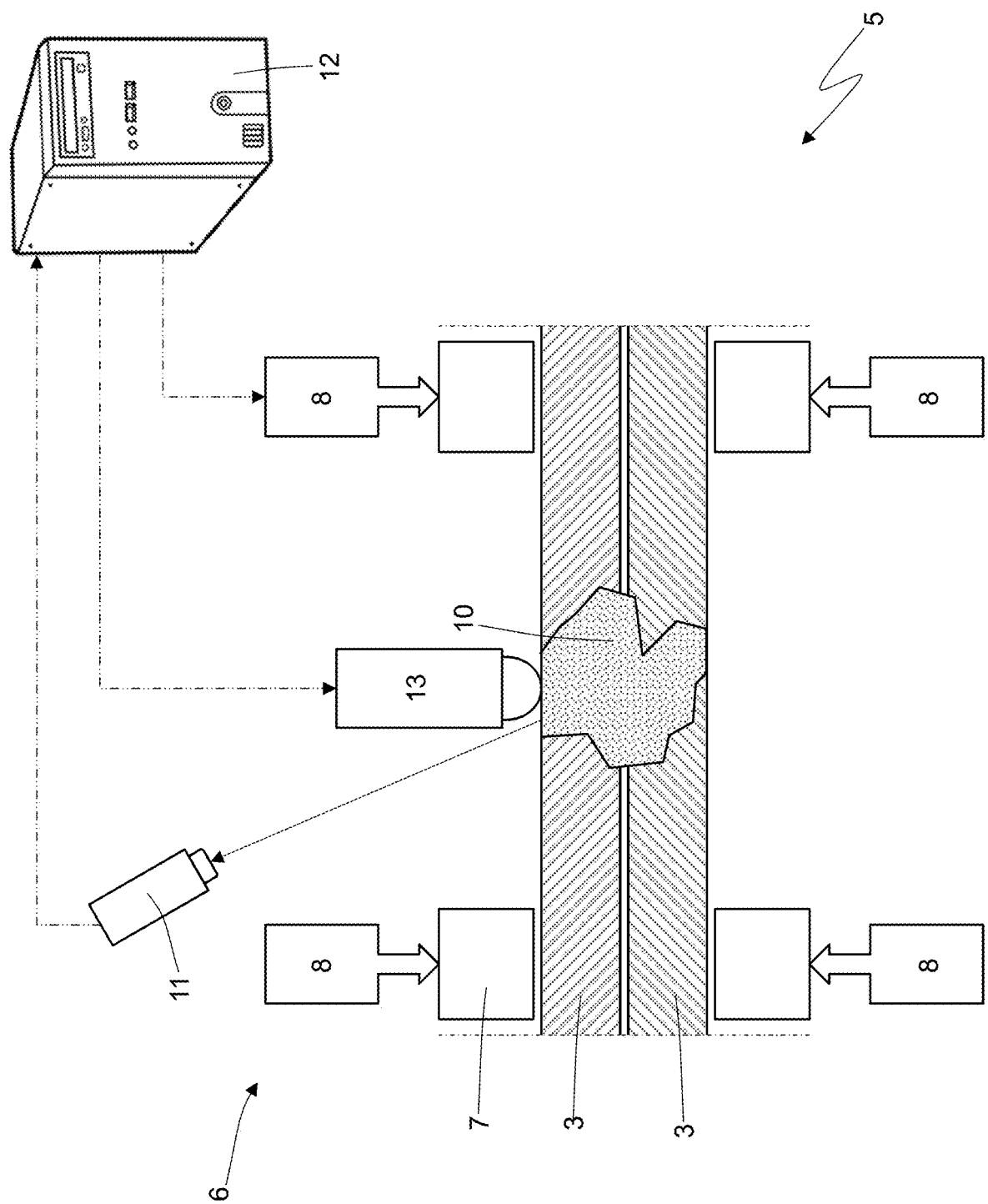
FIG. 4 is a variant of the welding unit of FIG. 3.

In the embodiment illustrated in FIG. 3, the heating takes place by means of a laser beam emitted by the emitter device 9. In the variant illustrated in FIG. 4, the heating takes place by means of ultrasounds, generating vibrations (at ultrasonic frequency) that act upon one of the two electrodes 3 (i.e. on an electrode 3 or upon the other element to which the electrode 3 must be welded); in particular, the welding unit 5 comprises a sonotrode 13 coupled with a vibrating assembly provided with a piezoelectric transducer. The sonotrode 13 generates friction between the two electrodes 3 by means of a vibration with an ultrasonic frequency and this intense vibration generates heat. In this embodiment, the heating is changed by changing an intensity and/or a frequency of the vibrations.

The above-described method to execute a weld has numerous advantages.

In the first place, the above-described method to execute a weld allows obtaining welds of excellent quality (i.e. of low electrical resistance and of high mechanical resistance) as it allows correcting the welding process during the execution so as to compensate for any accidental errors and thus always ensuring an optimal execution.

Furthermore, the above-described method to execute a weld is easy and cost-effective to implement as it requires the use of commercial components (essentially the thermographic video camera 11) of relatively modest cost and as it requires a modest computing power for the modern processing systems.

LIST OF REFERENCE NUMERALS OF THE FIGURES

1 battery
2 cells
3 electrodes
4 welds
5 welding unit
6 joining device
7 jaws
8 actuators
9 emitter device
10 weld pool
11 video camera
12 processing device
13 sonotrode

The invention claimed is:

1. A method to execute a weld of an electrode (3) of a cell (2) which is part of a battery (1); the execution method comprises the steps of:
    causing the electrode (3) to come into contact with another element to which the electrode (3) must be welded;
    locally heating the electrode (3) and the other element so as to locally cause a melting of the metal making up the electrode (3) and of the metal making up the other element in order to generate a weld pool (10);
    waiting for the weld pool (10) to cool down, thus giving stability to the weld;
    capturing, by means of a video camera (11), a series of digital images of the weld pool (10) during the heating;
    analysing the digital images in order to determine a value of at least one first parameter of the welding process; and
    changing the execution of the melting process based on the value of the first parameter;
    wherein the first parameter is the presence of areas of the weld pool (10) without melted metal.

2. The weld execution method according to claim 1, wherein:
    the electrode (3) and the other element are pressed against one another with a predetermined pressure; and
    in case of presence of areas of the weld pool (10) without melted metal, the pressure with which the electrode (3) and the other element are pressed against one another is increased.

3. The weld execution method according to claim 1, wherein the video camera (11) is a thermographic camera which is sensitive to infrared radiation and, therefore, is capable of generating thermographic digital images.

4. The weld execution method according to claim 2, wherein a second parameter additional to the first parameter is a temperature of the weld pool (10).

5. The weld execution method according to claim 4, wherein the heating is changed based on the temperature of the weld pool (10).

6. The weld execution method according to claim 4, wherein, if the temperature of the weld pool (10) is below a first threshold value, the heating is increased and, if the temperature of the weld pool (10) exceeds a second threshold value, the heating is decreased.

7. The weld execution method according to claim 3, wherein a second parameter additional to the first parameter is a size of the weld pool (10).

8. The weld execution method according to claim 6, wherein the heating is changed based on the size of the weld pool (10).

9. The weld execution method according to claim 7, wherein, if the size of the weld pool (10) is below a third threshold value, the heating is increased and, if the size of the weld pool (10) exceeds a fourth threshold value, the heating is decreased.

10. The weld execution method according to claim 7, wherein:
    the heating takes place by means of a laser beam, which is focussed on the electrode (3) or on the other element and is progressively shifted so as to move along at least one heating line; and
    if the size of the weld pool (10) is below a third threshold value, a width of a focussing point of the laser beam is increased and, if the size of the weld pool (10) exceeds a fourth threshold value, the width of the focussing point of the laser beam is decreased.

11. The weld execution method according to claim 7, wherein the size of the weld pool (10) is also determined based on a measure of the electrical resistance between the electrode (3) and the other element.

12. The weld execution method according to claim 6, wherein:
    the heating takes place by means of a laser beam, which is focussed on the electrode (3) or on the other element and is progressively shifted so as to move along at least one heating line; and
    the heating is changed by changing a speed with which the laser beam is moved along the heating line.

13. The weld execution method according to claim 6, wherein:
    the heating takes place by means of ultrasounds generating vibrations that act upon the electrode (3) or upon the other element; and
    the heating is changed by changing an intensity and/or a frequency of the vibrations.

14. A method to execute a weld of an electrode (3) of a cell (2) which is part of a battery (1); the execution method comprises the steps of:
    causing the electrode (3) to come into contact with another element to which the electrode (3) must be welded;
    locally heating the electrode (3) and the other element so as to locally cause a melting of the metal making up the electrode (3) and of the metal making up the other element in order to generate a weld pool (10);
    waiting for the weld pool (10) to cool down, thus giving stability to the weld;
    determining a size of the weld pool (10) during the heating;
    changing the execution of the melting process based on the size of the weld pool (10);
    measuring an electrical resistance between the electrode (3) and the other element during the heating; and
    determining the size of the weld pool (10) based on the electrical resistance between the electrode (3) and the other element.

15. The weld execution method according to claim 14, wherein the size of the weld pool (10) is estimated the larger the smaller the electrical resistance between the electrode (3) and the other element.

16. The weld execution method according to claim 14 and comprising the further steps of:

capturing, by means of a video camera (11) sensitive to infrared radiation, a series of thermographic digital images of the weld pool (10) during the heating; and
analysing the thermographic digital images to determine the size of the weld pool (10) in addition to the determination of the size of the weld pool (10) carried out based on the electrical resistance between the electrode (3) and the other element.

* * * * *